C. R. UHL.
BAR COUPLING.
APPLICATION FILED SEPT. 26, 1916.
1,264,227.
Patented Apr. 30, 1918.
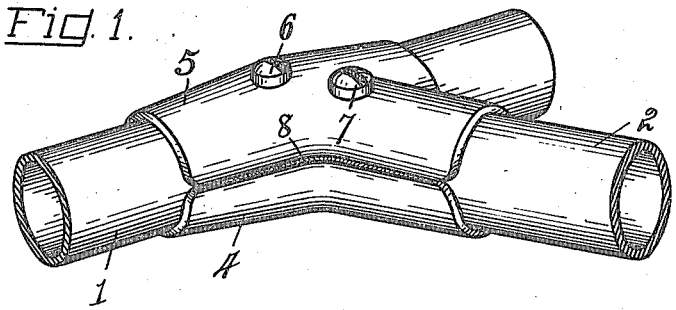
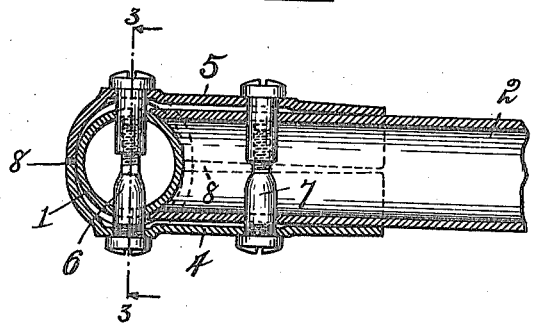
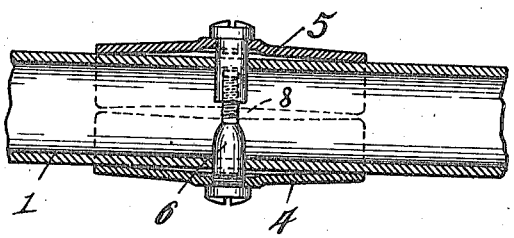
INVENTOR
Clement R. Uhl,
By Owen, Owen & Crampton,
His attys.

UNITED STATES PATENT OFFICE.

CLEMENT R. UHL, OF TOLEDO, OHIO.

BAR-COUPLING.

1,264,227.　　　　　Specification of Letters Patent.　　Patented Apr. 30, 1918.

Application filed September 26, 1916.　Serial No. 122,222.

*To all whom it may concern:*

Be it known that I, CLEMENT R. UHL, a citizen of the United States, and a resident of Toledo, in the county of Lucas and State of Ohio, have invented a certain new and useful Bar-Coupling; and I do hereby declare the following to be a full, clear, and exact description of the invention, such as will enable others skilled in the art to which it appertains to make and use the same, reference being had to the accompanying drawings, and to the characters of reference marked thereon, which form a part of this specification.

This invention relates to coupling means for rods, bars, tubes, or the like, and has for its object the provision of an improved coupling means of this character which is simple, strong and inexpensive in its construction and capable of being easily and quickly applied to parts to be coupled together and to effectively and rigidly clamp such parts in assembled relation.

The invention is fully described in the following specification, and while, in its broader aspect, it is capable of embodiment in numerous forms, a preferred embodiment thereof is illustrated in the accompanying drawings, in which—

Figure 1 is a perspective view of two bar-like members coupled together by a T-form of coupling embodying my invention, and Figs. 2 and 3 are different sectional views thereof with the section of the latter taken on the line 3—3 in Fig. 2.

Referring to the drawings, 1 and 2 designate two rods or bars to be coupled together, which bars, in the present instance, are of tubular form, and 3 a T-form of clamp or coupling for securing the bars together with one projecting at a right angle from the other intermediate the ends thereof.

The coupling 3, in the present instance, comprises the two clamping sections 4 and 5, which embrace in opposing relation the bars to be coupled together. Each of these sections is preferably of bulged form or flared outwardly toward its center from each end thereof so that the section, when placed on the bars to be coupled together, normally makes contact therewith only at its ends and has its central portion spaced or sprung outward from the bars, as illustrated. The coupling sections are made of a material of a springy nature to adapt the bulged portions thereof to be drawn inward toward and in clamping engagement with the clamped bars when an inward compressing stress is applied thereto. This stress is applied, in the present instance, by bolts 6 and 7, one of which projects through the bar 1, while the other projects through the bar 2 centrally of their sides. When the coupling sections are drawn together they firmly clamp the bars for the entire length of the coupling, sufficient clear space being left between the edges of the sections for such purpose, as shown at 8.

It is found in practice that this form of coupling, when the members thereof are clamped together on the bars 1 and 2 in inwardly sprung relation thereto, provides a very efficient and strong means for coupling the bars together in rigid relation, and that the bolts 6 and 7, in addition to applying an inward compressing stress to the normally outwardly sprung portions of the coupling members, also serve to prevent relative movements of the engaged bars.

The constant longitudinal stress which is applied to the bolts by the outward springing tendency of the clamps when tightened tends to prevent the bolts from loosening.

I wish it understood that my invention is not limited to any specific construction, arrangement or form of the parts or to the specific form of coupling illustrated, as it may be employed for coupling bars together in different arrangements from that illustrated within the scope of the claims.

Having thus described my invention, what I claim as new, and desire to secure by Letters Patent, is—

1. The combination with a plurality of bars, of a coupling for said bars comprising semi-cylindrical clamping members for embracing adjacent portions of said bars, in opposed relation, said members being bulged outward from their ends to their central portions, and means acting on the bulged portions of said members for effecting an inward drawing of such portions.

2. The combination with a plurality of bars, of a coupling for said bars, said coupling comprising opposed clamping members of bulged form, with their end portions only adapted to normally rest on the bars to be coupled, and means extending through the bulged portions of the coupling members and the bars for drawing the coupling members together on the bars and effecting an inward compressing of their bulged portions.

3. A coupling of the class described comprising opposed semi-cylindrical coupling members of bulged form, and clamping bolts connecting the bulged portions of said members and passing therethrough and operable to effect an inward compressing of the bulged portions of the members.

4. The combination with a plurality of bars, of a coupling for said bars having a pair of opposed semi-cylindrical clamping members, one at least having its central portion of bulged form, and means extending through said coupling members and bars and operable to bind them together and inwardly compress the bulged portion of the bulged member.

In testimony whereof, I have hereunto signed my name to this specification.

CLEMENT R. UHL.